(No Model.)
T. BARNETT.
BROILER AND TOASTER.
No. 476,508. Patented June 7, 1892.
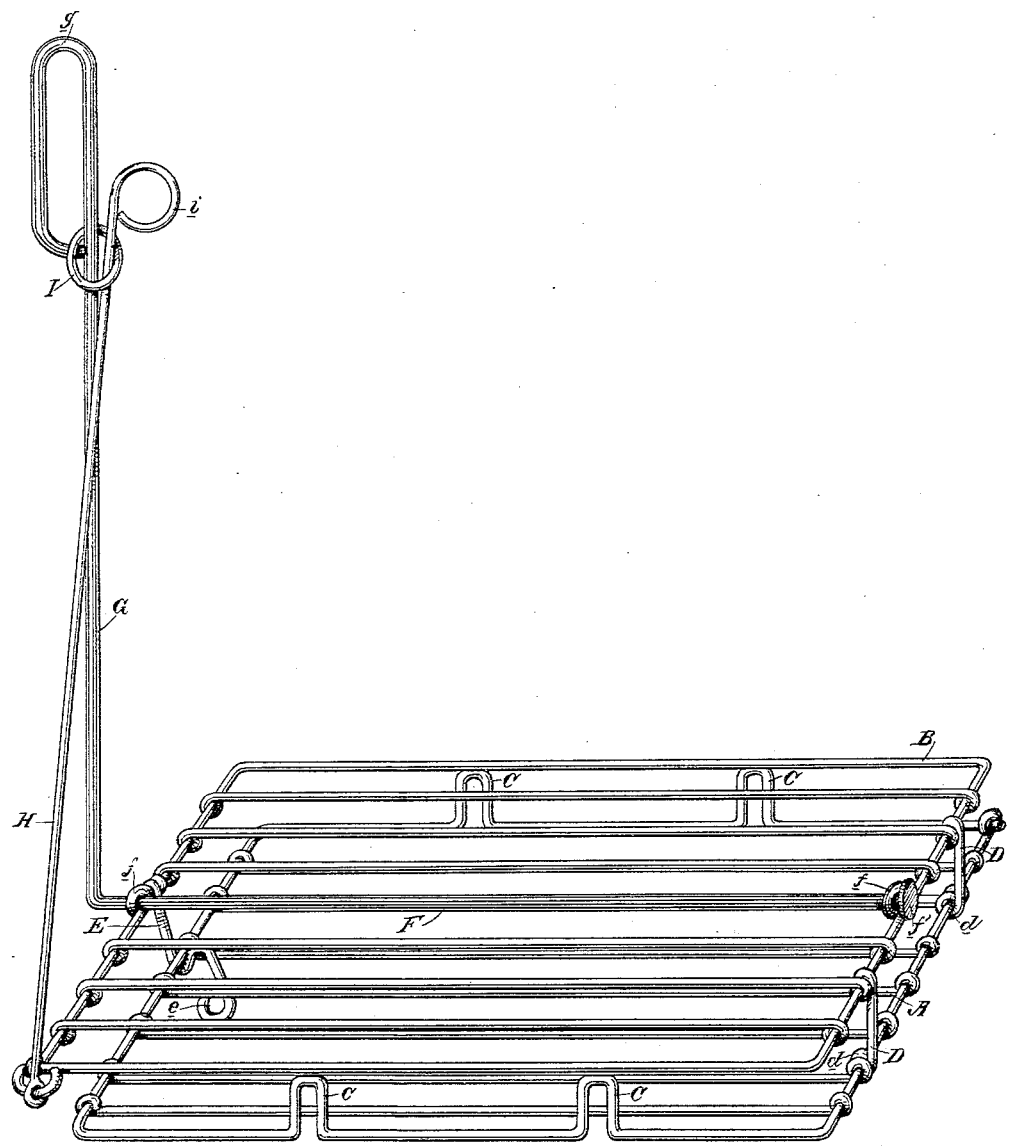
Witnesses,
J. H. Nourse
H. F. Aschuck
Inventor,
Thomas Barnett
By Dewey & Co.
Attys

UNITED STATES PATENT OFFICE.

THOMAS BARNETT, OF SAN FRANCISCO, CALIFORNIA.

BROILER AND TOASTER.

SPECIFICATION forming part of Letters Patent No. 476,508, dated June 7, 1892.

Application filed July 21, 1891. Serial No. 400,253. (No model.)

*To all whom it may concern:*

Be it known that I, THOMAS BARNETT, a citizen of the United States, residing in the city and county of San Francisco, State of California, have invented an Improvement in Broilers and Toasters; and I hereby declare the following to be a full, clear, and exact description of the same.

My invention relates to the class of cooking utensils used for broiling and toasting.

It consists in a suitably-constructed retaining-frame connected with its handle by a hinge-joint in such a manner that it can be readily reversed to turn the material over.

It also consists in the novel construction of the hinge-joint in connection with the frame and handle, the means for reversing the frame, and in other details of construction and arrangement, all of which I shall hereinafter fully describe, and specifically point out in the claims.

The object of my invention is to provide a broiler and toaster of a shape and construction adapting it to be readily inserted in the fire-chamber of the stove, preferably through a single griddle-hole thereof, and to rest directly upon the coals, its handle and turn-rod extending upwardly out of the stove-top in convenient and cool position, whereby the device may be readily handled both in insertion and removal and in reversing it while still in the stove.

Referring to the accompanying drawing for a more complete explanation of my invention, the figure is a perspective view of my broiler and toaster.

The frame is composed of a lower rack A and an upper rack B. These are preferably made of wire, fastened together, an easy construction being to make the boundary-wires of each rack of one bent piece and to extend the intervening wires longitudinally and parallel, their ends being secured to the end portions of the boundary-wires. One of these latter wires, here shown as that of the lower rack A, is bent at its sides, as shown at C, so as to hold the meat or bread firmly in place when the two racks are closed together.

At one end the racks are connected by wires D, which serve to hold them a sufficient distance apart to receive the meat or article to be cooked, and the end bar of one of the racks turns loosely in the eyes which are formed in these connecting-wires, thereby constituting a hinge. A good way to form this hinge is to make the connecting-wires D out of the ends of two of the longitudinal wires of rack B, which said ends, as shown, twist about the boundary-wire ends and then form eyes $d$ to receive the boundary-wire end of the other rack. At the opposite end the two racks are held together by a locking-link E, which is a piece of wire twisted on the upper rack end and bent to engage the lower rack end and to project below to form an eye $e$, in which the tine of a fork may be readily introduced to open it.

F is a rod extending through journals $f$, which are made in the end wires of the upper rack by twisting said wires so as to form an eye in the central portion of each end. Through these eyes the rod passes, having a head or washer $f'$ on the outer end to prevent the rack from slipping off. At the opposite end the rod is turned at right angles to form the handle G and extends a sufficient distance upwardly, so that by holding it by the convenient finger-loop $g$ on its upper end the frame composed of the two racks may be introduced into the stove, while the handle extends a considerable distance above it.

H is a rod, one end of which is pivotally connected with the end of the upper rack nearest to the handle. The other end of rod H extends through a ring I, which is attached to the loop $g$ of the handle G, and a finger-loop $i$ is made upon this rod by which it can be easily operated. By pulling upon this rod until the racks have been turned up edgewise and then pushing down upon the other side the racks are easily reversed and the other side of the meat or other article presented to the fire. The advantage of this constuction is that because of its general shape and the presence of the upturned handle the broiler can be easily introduced into the stove by removing a single lid or griddle at one end, and with a very small fire the meat can be properly broiled, because the racks can be placed down directly upon the coals. In this low position the fumes and vapors arising from the cooking material will be caught by the general draft of the stove and carried out through the stove-channels, instead of coming out into the room, as is the case where the ordinary top broiler is used.

The broiler can be turned over without removing it from the stove, and can in all respects be manipulated conveniently and without danger of burning the hands or dropping the material. When out of use, the broiler can be laid down flat, with its handle and turn-rod also flat, and it can be conveniently hung up out of the way. When in use, the handle G will remain in an upright position, being braced on one side and limited on the other side by the turn-rod. If for any reason the fire-chamber of the stove be contracted, as by the presence of a large water-back or large quantity of coal, rendering it difficult or impossible to reverse the frame while in the stove, it can be readily removed, reversed outside, and as easily returned, the drip being caught in the meantime by the open hole in the stove.

Having thus described my invention, what I claim as new, and desire to secure by Letters Patent, is—

1. A broiler and toaster consisting of a containing-frame, a handle therefor, a hinge connection between frame and handle, and a rod connected with the frame to reverse it, substantially as herein described.

2. A broiler and toaster consisting of a containing-frame, a handle at one end, to which said frame is hinged, whereby it may be reversed, and a rod connected with the frame at one end and guided by the handle to reverse said frame, substantially as herein described.

3. A broiler and toaster consisting of a containing-frame, a rod upon which said frame is hinged, whereby it may be reversed, an upturned handle formed or connected with said hinge-rod, and a rod connected with the frame for turning it, substantially as herein described.

4. A broiler and toaster consisting of a containing-frame, a rod extending in the longitudinal center plane of and journaled in the frame, whereby the latter may be reversed, an upturned handle formed or connected with one end of the hinge-rod, and a rod connected with one side of the frame for turning it, substantially as herein described.

5. A broiler and toaster consisting of the containing-frame, the central hinge-rod with its upturned end handle, the turning-rod connected with the frame-corner, and the ring connecting the handle and rod, substantially as herein described.

6. A broiler and toaster consisting of the containing-frame composed of the upper and lower wire racks hinged together at one end and having a fastening-link at the other, the longitudinal central rod journaled in the ends of the upper rack, the upturned handle end of the rod, and the turning-rod connected with the corner of the upper frame and guided by the handle, substantially as herein described.

In witness whereof I have hereunto set my hand.

THOMAS BARNETT.

Witnesses:
S. H. NOURSE,
J. A. BAYLESS.